(12) United States Patent
Brinas

(10) Patent No.: US 9,481,224 B2
(45) Date of Patent: Nov. 1, 2016

(54) ACTIVE AIRFLOW OUTLET FOR A VEHICLE AND METHOD

(71) Applicant: GM GLOBAL TECHNOLOGY OPERATIONS LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 984 days.

(21) Appl. No.: 13/665,968

(22) Filed: Nov. 1, 2012

(65) Prior Publication Data

US 2014/0120823 A1 May 1, 2014

(51) Int. Cl.
*B60H 1/00* (2006.01)
*B60H 1/34* (2006.01)

(52) U.S. Cl.
CPC ............ *B60H 1/00464* (2013.01); *B60H 1/34* (2013.01); *B60H 2001/3478* (2013.01)

(58) Field of Classification Search
CPC ................ B60H 1/00464; B60H 1/34; B60H 2001/3478
USPC .......................................................... 454/155
See application file for complete search history.

(56) References Cited

U.S. PATENT DOCUMENTS

| | | | | |
|---|---|---|---|---|
| 1,643,892 A * | 9/1927 | Hull | ............................ | F25D 3/06 454/91 |
| 1,928,332 A * | 9/1933 | Downs | ...................... | F24F 3/02 165/225 |
| 1,978,128 A * | 10/1934 | Downs | ................... | F04D 29/462 415/160 |
| 1,978,129 A * | 10/1934 | Downs | ................... | F04D 29/462 415/160 |
| 2,112,955 A * | 4/1938 | Downs | ................... | F24F 11/025 454/233 |
| 2,869,535 A * | 1/1959 | Horrell | ................... | B64D 13/08 126/110 R |
| 3,199,773 A * | 8/1965 | Stirling | ................. | F04D 25/166 415/143 |
| 4,135,440 A * | 1/1979 | Schmidt | ................ | F24F 3/0527 454/185 |
| 4,656,926 A * | 4/1987 | Bauer | ................... | B60H 1/0065 251/248 |
| 4,782,742 A * | 11/1988 | Yott | .................... | B60H 1/00471 454/152 |
| 6,598,665 B2 * | 7/2003 | Schwarz | ............ | B60H 1/00064 165/203 |
| 6,830,511 B2 * | 12/2004 | Gehring | ............... | B60H 1/3421 454/152 |

(Continued)

FOREIGN PATENT DOCUMENTS

CN 1580662 A 2/2005
CN 1843792 A 10/2006

(Continued)

*Primary Examiner* — Alissa Tompkins
*Assistant Examiner* — Frances F Hamilton
(74) *Attorney, Agent, or Firm* — Quinn Law Group

(57) ABSTRACT

An active airflow outlet for a vehicle and method for facilitating airflow through an active airflow outlet are provided. The active airflow outlet may operate in one of a static mode and an active mode. The active airflow outlet may include a motor, a gear assembly, a plurality of vent blades, and at least one control mechanism. The gear assembly may be operatively connected to the motor and the plurality of vent blades. The plurality of vent blades may be capable of occupying one of an open position and a closed position. The at least one control mechanism may be configured to signal the plurality of vent blades to rotate from the closed position to the open position and signal the motor to rotate the gear assembly and the plurality of vent blades in the active mode to facilitate additional airflow through the active airflow outlet.

16 Claims, 3 Drawing Sheets

(56) References Cited

U.S. PATENT DOCUMENTS

| | | | | |
|---|---|---|---|---|
| 7,997,964 B2* | 8/2011 | Gehring | .................. | B60H 1/345 454/152 |
| 8,113,229 B2* | 2/2012 | Bosma | .................. | B60H 1/3421 137/353 |
| 2004/0005854 A1 | 1/2004 | Shin | | |
| 2004/0038643 A1* | 2/2004 | Katagiri | ............... | B60H 1/3421 454/314 |
| 2007/0060035 A1* | 3/2007 | Burr | .................... | B60H 1/3442 454/155 |
| 2008/0105754 A1* | 5/2008 | Baruschke | ......... | B60H 1/00735 236/91 F |
| 2011/0111685 A1* | 5/2011 | Benamira | ............ | B60H 1/3442 454/155 |
| 2013/0165034 A1* | 6/2013 | Jang | ..................... | B60H 1/3428 454/155 |
| 2014/0295746 A1* | 10/2014 | Chagnon | ............ | B60H 1/00371 454/75 |
| 2015/0202946 A1* | 7/2015 | Inagaki | ................ | B60H 1/3428 454/154 |

FOREIGN PATENT DOCUMENTS

| | | |
|---|---|---|
| CN | 201077341 Y | 6/2008 |
| DE | 19910774 A1 | 9/2000 |
| KR | 100586004 B1 | 6/2006 |

\* cited by examiner

ACTIVE AIRFLOW OUTLET FOR A VEHICLE AND METHOD

TECHNICAL FIELD

The disclosure generally relates to an active airflow outlet, particularly to an active airflow outlet incorporated into a vehicular heating ventilation and air conditioning (HVAC) system.

BACKGROUND

Conventional vehicle interior passenger compartments include airflow systems for passenger comfort. These airflow systems deliver heated, cooled, or ambient air into the passenger compartment of the vehicle through airflow outlets. These airflow outlets generally include a single outlet vent blade, which is rotatable about a pin connection between a fully closed position and a fully open position. The outlet vent blade is generally configured to be controllable with control knobs or thumb wheels designed to permit or block airflow through the outlet partially or completely.

Conventional outlet vent blades within the airflow outlet are passive. The blade simply functions to allow the maximum allowable airflow or restrict airflow to a degree desired by the vehicle passenger. Conventional vent blades do not assist in facilitating and increasing airflow through the outlet and into the vehicle interior passenger compartment.

SUMMARY

An active airflow outlet for a vehicle is provided. The active airflow outlet may operate in one of a static mode and an active mode. The active airflow outlet may include a motor, a gear assembly, a plurality of vent blades, and at least one control mechanism. The gear assembly may be operatively connected to the motor and the plurality of vent blades. The plurality of vent blades may be capable of occupying one of an open position and a closed position.

The at least one control mechanism may be configured to signal the plurality of vent blades to rotate from the closed position to the open position and signal the motor to rotate the gear assembly and the plurality of vent blades in active mode to facilitate and increase airflow through the active airflow outlet. This allows the gear assembly and vent blades to act as a fan to facilitate airflow through the airflow outlet to improve outlet performance, reduce time for temperature change in the vehicle passenger compartment, and reduce HVAC module load requirements.

A method of actively facilitating airflow through an active airflow outlet is also provided. The method comprises the steps of: providing an active airflow outlet having a motor, a gear assembly, a plurality of vent blades, and at least one control mechanism, the active airflow outlet capable of operating in an active mode and a static mode; placing the active airflow outlet in the static mode, wherein the plurality of vent blades are in the closed position; rotating the plurality of vent blades in a first direction to place the plurality of vent blades in the open position; starting the motor, to place the active airflow outlet in active mode, wherein the motor rotates the gear assembly causing rotation of the plurality of vent blades in the open position to facilitate and increase airflow through the active airflow outlet.

The method may further include the steps of: deactivating the motor to place the active airflow outlet in static mode, wherein the gear assembly ceases rotation; and rotating the plurality of vent blades in a second direction to place the plurality of vent blades in the fully closed position.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
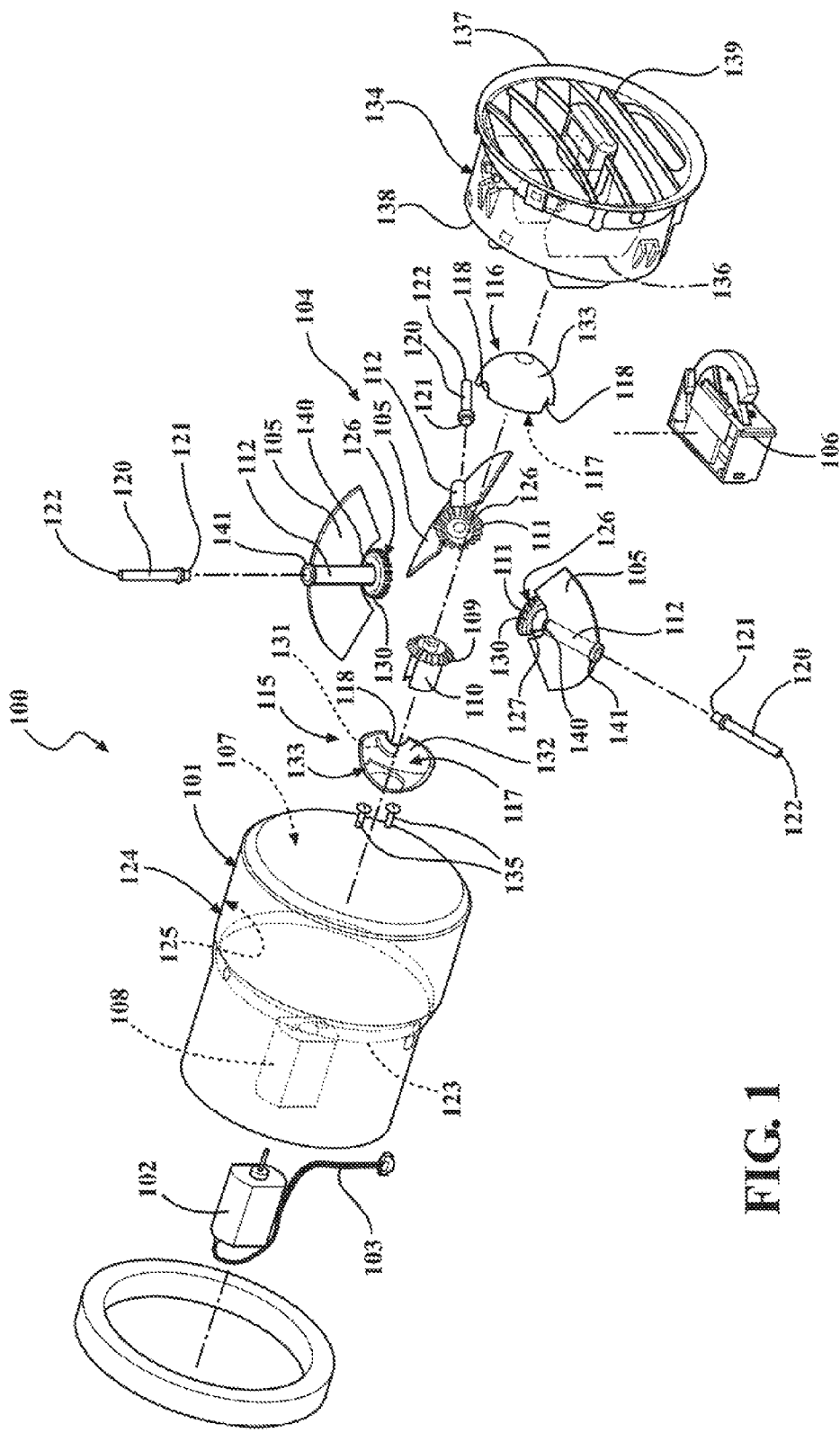
FIG. 1 is a schematic exploded view of the active airflow outlet.
Figure 2:
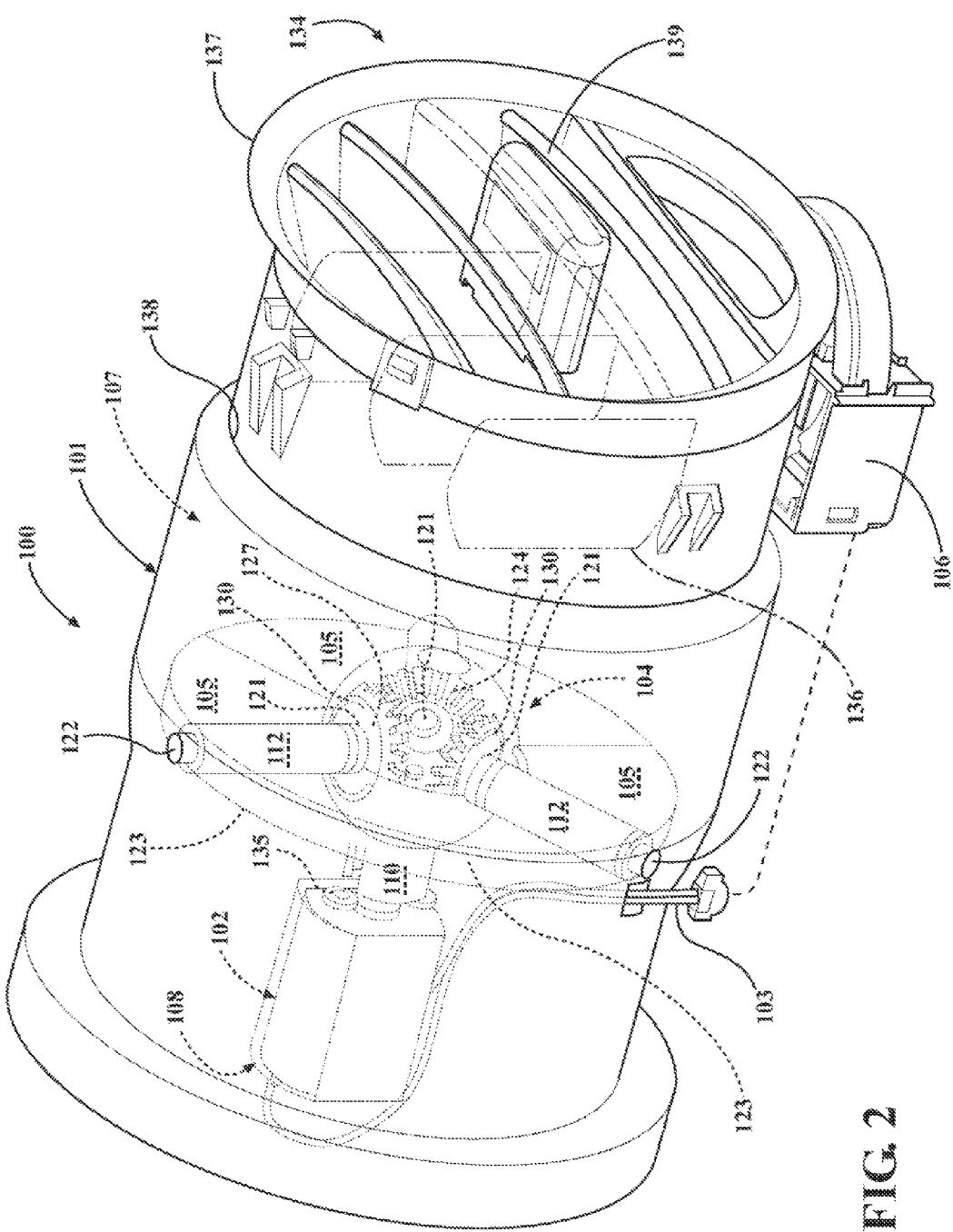
FIG. 2 is a schematic perspective view of the active airflow outlet, wherein the plurality of vent blades is in the fully closed position.
Figure 3:
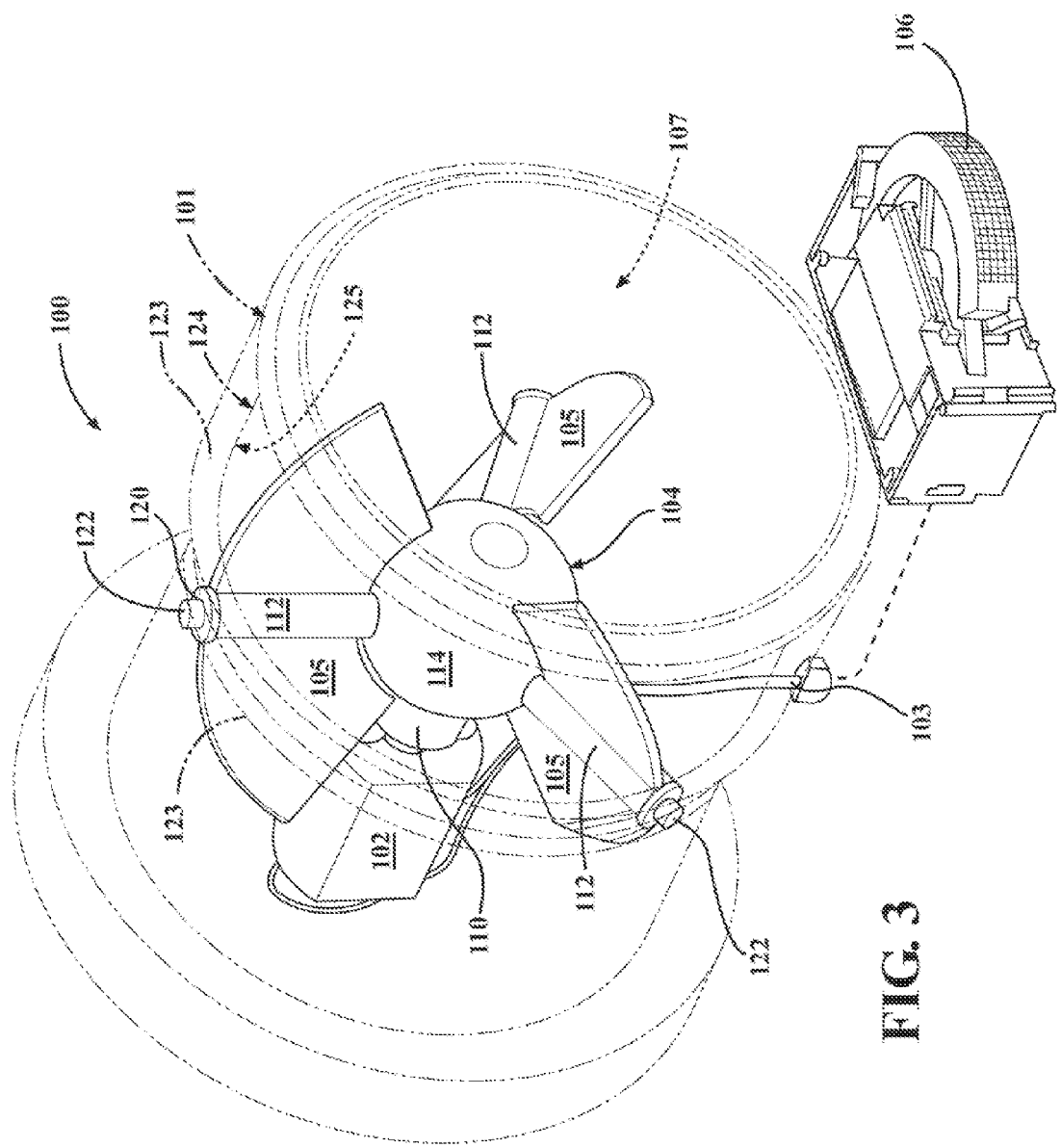
FIG. 3 is a partial schematic perspective view of the active airflow outlet wherein the plurality of vent blades is in the open position.

Referring to the Figures, wherein like reference numbers correspond to like or similar components throughout the several views, an active airflow outlet 100 for a vehicle and a method for facilitating airflow through an active airflow outlet 100 are provided. Referring generally to FIGS. 1-3, a plurality of active airflow outlets 100 may form a vehicular airflow outlet system. The plurality of active airflow outlets 100 may be arranged throughout the passenger compartment of a vehicle to promote heating and cooling of the passenger compartment to improve passenger comfort.

The active airflow outlet 100 may generally include a motor 102, a gear assembly 104 operatively connected to the motor 102, a plurality of vent blades 105 operatively connected to the gear assembly, and at least one control mechanism 103, 106.

The active airflow outlet 100 may operate in one of a static mode and an active mode. In static mode, the vehicle HVAC module propels airflow through the active airflow outlet 100. In static mode, the plurality of vent blades 105 may be in one of an open position (FIG. 3) or a closed position (FIG. 2). In active mode, the plurality of vent blades 105 may be in the open position. Further, in active mode, the plurality of vent blades 105 may rotate to act as a fan to facilitate additional airflow therethrough to actively propel additional airflow through the active airflow outlet 100 in order to improve outlet 100 performance by reaching passenger target points and reducing the time required to facilitate temperature change in the passenger compartment while reducing HVAC module load requirements.

Referring to FIG. 1, the gear assembly 104 may generally include at least one drive gear 109, a plurality of driven gears 111, and a gear housing 114. The at least one drive gear 109 may have a drive gear coupling member 110 extending outwardly from the drive gear 109. The drive gear coupling member 110 may be configured to couple the drive gear 109 to the motor 102, such that the drive gear 109 may be driven by the motor 102 when the motor is signaled by the at least one control mechanism 103, 106 to begin active mode rotation of the gear assembly 104 and the plurality of vent blades 105.

When driven by the motor 102, in active mode, the at least one drive gear 109 may be configured to drive a plurality of driven gears 111. Each of the driven gears 111 may have a first surface 126 and a second surface 127. Each of the driven gears 111 may also be coupled to a driven gear coupling member 112 having a base end 140 and a distal end 141. Each of the driven gear coupling members 112 extending from the base end 140 proximate the second surface 127 of the driven gear 111 to the distal end 141. As shown in FIG. 2, the second surface 127 of each of the plurality of driven gears 111 may define a plurality of convex stability ridges 130 thereon, which may be formed about the base end 140 of the driven gear coupling member 112 at the juncture between the driven gear coupling member 112 and the second surface 127.

The gear housing 114 may house and couple the at least one drive gear 109 and the plurality of driven gears 111. The gear housing 114 may have a first portion 115 and a second portion 116.

The first portion 115 of the gear housing 114 may be coupled with the second portion 116 of the gear housing 114. When coupled, the first portion 115 and second portion 116 of the gear assembly housing 114 may define an interior void 117, a plurality of bore holes 118, an inwardly facing surface 132, and an outwardly facing surface 133. The inwardly facing surface 132 may define a plurality of concave stability slots 131 that may extend from the inwardly facing surface 132 to the outwardly facing surface 133. Each of the concave stability slots 131 of the gear housing 114 may be configured to receive one of the convex stability ridges 130 defined by the second surface 127 of each of the respective driven gears 111.

The at least one drive gear 109 and the plurality of driven gears 111 may be coupled and housed within the interior void 117 of the gear housing 114. The drive gear coupling member 110 and the each of the driven gear coupling members 112 may be disposed within one of the bore holes 118 defined by the first portion 115 and second portion 116 of the gear housing 114, when the drive gear 109 and driven gears 111 are coupled and housed within the interior void 117. The drive gear coupling member 110 and each of the driven gear coupling members 112 may extend from each of the respective drive gear 109 or driven gears 111 through one of the bore holes defined by the gear housing 114 and extend outside the gear housing 114. The plurality of vent blades 105 may be coupled to and extend outwardly from each of the driven gear coupling members 112.

The gear assembly 104 may also include a plurality of vent blade rotation pins 120. Each vent blade rotation pin having a first end 121 and a second end 122. Each vent blade rotation pin 120 may be disposed within one of the driven gear coupling members 112, wherein the first end 121 is positioned proximate to the driven gear 111 base end 140 and the second end 122 is positioned proximate the driven gear coupling member distal end 141. The plurality of vent blades 105 may be capable of controllably rotating about the plurality of rotation pins 120, thereby rotating from the fully closed position (shown in FIG. 2) to the open position (shown in FIG. 3) or from the open position to the closed position.

As shown in FIGS. 1 and 2, the rotation of the vent blades 105 is limited in the open position by the interaction between each of the concave stability slots 131 of the gear assembly housing 114 and the convex stability ridges 130 defined by the second surface 127 of each of the respective driven gears 111. The interconnection of each of the concave stability slots 131 and the convex stability ridges 130 acts as a stop, which limits the rotation of the driven gears 111 and the plurality of vent blades 105.

The plurality of vent blades 105 may be maintained in one of a closed position and an open position. In the fully closed position (shown in FIG. 2) the angle of the plurality of vent blades 105 is approximately zero degrees, as all vent blades 105 are aligned to fully close the active airflow outlet 100. In the open position the vent blades 105 are positioned to allow air to flow through the active airflow outlet 100 and into the passenger compartment of the vehicle (as shown in FIG. 3).

In one example, the vent blades 105 are positioned at an angle of approximately thirty-five degrees in the open position. In a second example, the vent blades 105 are positioned at an angle of approximately seventy degrees in the open position.

The at least one control mechanism 103, 106 may be configured to signal the plurality of vent blades 105 to occupy the open position in active mode and signal the motor 102 to rotate the gear assembly 104 and the plurality of vent blades 105 in active mode, allowing the plurality of vent blades 105 to act as a fan to facilitate and increase airflow through the active airflow outlet 100.

The at least one control mechanism may include a first control mechanism 106 configured to rotate the plurality of vent blades 105 to place the plurality of vent blades 105 in one of an open position (shown in FIG. 3) and a fully closed position (shown in FIG. 2). The first control mechanism 106 may be a mechanical control mechanism located within the passenger compartment of the vehicle such as a thumb wheel, control knob, or the like. The first control mechanism may also be an electrical control mechanism and may be integrally connected to and receive passenger requests from an instrument panel (not shown) in the passenger compartment of a vehicle.

The at least one control mechanism may further include a second control mechanism 103, which may be configured to transition the active airflow outlet 100 from static mode to active mode or active mode to static mode through signaling the operation or deactivation of the motor 102 and further signaling the motor 102 to begin or cease rotation of the gear assembly 104 and plurality of vent blades 105. The second control mechanism 103 may be an electrical control mechanism and may be integrally connected to and receive passenger requests from an instrument panel (not shown) in the passenger compartment of a vehicle.

Referring to FIG. 2, the gear assembly and vent blades 105 may be disposed within an active outlet housing 101. The active outlet housing 101 may define a cavity 107 for receiving the gear assembly 104 and vent blades 105. The active outlet housing 101 may further define a motor housing support pocket 108 for housing the motor 102 therein. The motor 102 may be secured within the motor housing support pocket 108 with at least one fastening feature 135. The at least one fastening feature 135 may be a screw, nut and bolt, or the like.

The active outlet housing 101 may have an exterior surface 124 and an interior surface 125. The interior surface 125 may define a concave slot 123. As shown in FIGS. 2 and 3, the concave slot 123 formed by the interior surface 125 of the active outlet housing 101 may be configured to receive the second end 122 of each of the rotation pins 120 to limit the rotation of the gear assembly 104 to a single plane.

The active airflow outlet 100 may further include a vent housing 134 having a first end 137 and a second end 138. The second end 138 of the vent housing 134 may be disposed within the active outlet housing cavity 107. The vent housing 134 may further include a first plurality of vanes 139 configured to direct airflow through the active airflow outlet vertically within the passenger compartment and a second plurality of vanes 136 configured to direct airflow through the active airflow outlet horizontally through the passenger compartment.

The active airflow outlet 100 may operate in one of a static mode and an active mode. In static mode, the vehicle HVAC module attempts to propel airflow through the active airflow outlet 100. If the vent blades 105 are in the closed position (shown in FIG. 2) all airflow will be blocked and not allowed to pass to the passenger compartment. If the vent blades 105 are in the open position (shown in FIG. 3) airflow will pass through the active airflow outlet 100, but the vent blades 105 and the gear assembly 104 remain passive, simply allowing air to flow therethrough. In active mode, the open vent blades 105 and gear assembly 104 may act as a fan to facilitate and increase airflow through the active airflow outlet 100. As such, when the plurality of vent blades 105 are positioned in the open position, the motor 102, when signaled by the second control mechanism 103, may rotate the gear assembly 104 and the vent blades 105, allowing the gear assembly 104 and vent blades 105 to actively propel additional airflow through the active airflow outlet 100 in order to improve outlet 100 performance by reaching passenger target points and reducing the time required to facilitate temperature change in the passenger compartment while reducing HVAC module load requirements.

A method of actively facilitating airflow through an active airflow outlet 100 is also provided. The method may include the steps of: providing an active airflow outlet 100 having a motor, a gear assembly, a plurality of vent blades, and at least one control mechanism, the active airflow outlet 100 capable of operating in an active mode and a static mode; placing the active airflow outlet 100 in the static mode, wherein the plurality of vent blades 105 are in the closed position (shown in FIG. 2); rotating the plurality of vent blades 105 in a first direction to place the plurality of vent blades in the open position (shown in FIG. 3); starting the motor 102, to place the active airflow outlet 100 in active mode, wherein the motor 102 rotates the gear assembly 104 causing rotation of the plurality of vent blades 105 in the open position to facilitate and increase airflow through the active airflow outlet 100.

The method may further include the steps of: deactivating the motor 102 to place the active airflow outlet 100 in static mode, wherein the gear assembly 104 and plurality of vent blades 105 cease rotation; and rotating the plurality of vent blades 105 in a second direction to place the plurality of vent blades 105 in the closed position.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An active airflow outlet for a vehicle having an active mode and static mode, the active airflow outlet comprising:
   a motor;
   a gear assembly operatively connected to the motor, wherein the gear assembly includes:
      at least one drive gear configured to be driven by the motor, the at least one drive gear having a drive gear coupling member extending therefrom, such that the drive gear coupling member couples the drive gear to the motor;
      a plurality of driven gears configured to be driven by the drive gear, each driven gear having a driven gear coupling member extending therefrom;
      a plurality of vent blade rotation pins, wherein each vent blade rotation pin has a first end and a second end and is disposed within one of the driven gear coupling members;
      a gear housing having a first portion and a second portion, the first portion being coupled to the second portion to define an interior void and a plurality of bore holes, wherein each of the plurality of driven gears is engaged with the drive gear and disposed within the interior void defined by the gear housing, and wherein each of the driven gear coupling members and the drive gear coupling member is disposed within one of the plurality of bore holes and extend outside the gear housing;
   a plurality of vent blades coupled to the gear assembly, such that the respective driven gear coupling member couples each of the vent blades to one of the driven gears, the plurality of vent blades being moveable between an open position and a closed position;
   an active outlet housing defining a cavity, such that the motor, gear assembly, and plurality of vent blades are disposed within the cavity, wherein the cavity has an interior surface and an exterior surface, the interior surface defining a concave slot therein, such that the second end of each of the vent blade rotation pins is disposed within the concave slot;
   a first control mechanism configured to transition the plurality of vent blades between the closed position and the open position, such that the vent blades are actuated in one of a first direction and a second direction when transitioned between the open position and the closed position; and
   a second control mechanism configured to signal the motor to rotate the gear assembly and the plurality of vent blades in the active mode, allowing the plurality of vent blades to facilitate and increase airflow through the active airflow outlet.

2. The active airflow outlet of claim 1 wherein each of the driven gears has a first surface and a second surface, the second surface defining at a plurality of convex stability ridges thereon.

3. The active airflow outlet of claim 2 wherein the gear housing has an inwardly facing surface and an outwardly facing surface, the inwardly facing surface defining a plurality of concave stability slots, and wherein each of the concave stability slots of the gear housing are configured to receive one of the convex stability ridges formed on the second surface of each of the driven gears, to limit rotation of the plurality of vent blades between the open position and the closed position.

4. The active airflow outlet of claim 1 wherein the plurality of vent blades are maintained at a thirty-five degree angle in the open position.

5. The active airflow outlet of claim 1 wherein the plurality of vent blades are maintained at a seventy degree angle in the open position.

6. The active airflow outlet of claim 1 further comprising a vent housing having a first end, a second end, and a plurality of primary vanes and secondary vanes disposed within the first end, the primary vanes configured to direct airflow through the active airflow outlet vertically and the plurality of secondary vanes configured to direct airflow through the active airflow outlet horizontally, the vent housing second end disposed within the cavity defined by the active outlet housing.

7. A vehicle having a passenger compartment comprising:
at least one active airflow outlet including:
a motor having a motor shaft;
a gear assembly operatively connected to the motor shaft and rotatable therewith, wherein the gear assembly includes:
at least one drive gear configured to be driven by the motor shaft, the at least one drive gear having a drive gear coupling member extending therefrom, such that the drive gear coupling member couples the drive gear to the motor shaft;
a plurality of driven gears configured to be driven by the drive gear, each driven gear having a first surface and a second surface, and a driven gear coupling member extending therefrom, wherein the second surface defines a plurality of convex stability ridges thereon;
a plurality of vent blade rotation pins, wherein each vent blade rotation pin has a first end and a second end and is disposed within one of the driven gear coupling members;
a gear housing having:
a first portion and a second portion, the first portion being coupled to the second portion to define an interior void and a plurality of bore holes, such that the gear housing has an inwardly facing surface and an outwardly facing surface, wherein the inwardly facing surface defines a plurality of concave stability slots;
wherein each of the plurality of driven gears is engaged with the drive gear and disposed within the interior void defined by the gear housing;
wherein each of the driven gear coupling members and the drive gear coupling member is disposed within one of the plurality of bore holes and extend outside the gear housing; and
wherein each of the concave stability slots defined by the inwardly facing surface of the gear housing is configured to receive one of the convex stability ridges formed on the second surface of each of the driven gears;
a plurality of vent blades coupled to the gear assembly, such that the respective driven gear coupling member couples each of the vent blades to one of the driven gears, the plurality of vent blades being moveable between one of an open position and a closed position;
an active outlet housing defining a cavity, such that the motor, gear assembly, and plurality of vent blades are disposed within the cavity, wherein the cavity has an interior surface and an exterior surface, the interior surface defining a concave slot therein, such that the second end of each of the vent blade rotation pins is disposed within the concave slot;
a first control mechanism configured to transition the plurality of vent blades between the closed position and the open position, such that the vent blades are actuated in one of a first direction and a second direction when transitioned between the open position and the closed position; and
a second control mechanism configured to signal the motor to rotate the motor shaft, the gear assembly, and the plurality of vent blades in the active mode, allowing the plurality of vent blades to facilitate and increase airflow through the active airflow outlet.

8. The vehicle of claim 7 further comprising a vent housing having a first end, a second end, and a plurality of primary vanes and secondary vanes disposed within the first end, the primary vanes configured to direct airflow through the active airflow outlet vertically and the plurality of secondary vanes configured to direct airflow through the active airflow outlet horizontally, the vent housing second end disposed within the cavity defined by the active outlet housing.

9. An active airflow outlet for a vehicle having an active mode and a static mode, the active airflow outlet comprising:
a motor;
a gear assembly operatively connected to the motor, wherein the gear assembly includes:
at least one drive gear configured to be driven by the motor, the at least one drive gear having a drive gear coupling member extending therefrom, such that the drive gear coupling member couples the drive gear to the motor;
a plurality of driven gears configured to be driven by the drive gear, each driven gear having a first surface and a second surface, and a driven gear coupling member extending therefrom, wherein the second surface defines a plurality of convex stability ridges thereon;
a gear housing having:
a first portion and a second portion operatively coupled to the second portion to define an interior void and a plurality of bore holes, such that the gear housing has an inwardly facing surface and an outwardly facing surface, wherein the inwardly facing surface defines a plurality of concave stability slots;
wherein each of the plurality of driven gears is engaged with the drive gear and disposed within the interior void defined by the gear housing;
wherein each of the driven gear coupling members and the drive gear coupling member are disposed within one of the plurality of bore holes and extend outside the gear housing; and
wherein each of the concave stability slots defined by the inwardly facing surface of the gear housing are configured to receive one of the convex stability ridges formed on the second surface of each of the driven gears;
a plurality of vent blades coupled to the gear assembly, such that the respective driven gear coupling member couples each of the vent blades to one of the driven gears, the plurality of vent blades being moveable between an open position and a closed position;
an active outlet housing defining a cavity, such that the motor, gear assembly, and plurality of vent blades are disposed within the cavity;
a first control mechanism configured to transition the plurality of vent blades between the closed position and the open position, such that the vent blades are actuated in one of a first direction and a second direction when transitioned between the open position and the closed position; and
a second control mechanism configured to signal the motor to rotate the gear assembly and the plurality of vent blades in the active mode, allowing the plurality of vent blades to facilitate and increase airflow through the active airflow outlet.

10. The active airflow outlet of claim 9 wherein the gear assembly further includes a plurality of vent blade rotation pins, wherein each vent blade rotation pin has a first end and a second end and is disposed within one of the driven gear coupling members.

11. The active airflow outlet of claim 10 wherein the cavity defined by the active outlet housing has an interior surface and an exterior surface, the interior surface defining a concave slot therein, such that the second end of each of the vent blade rotation pins is disposed within the concave slot defined by the interior surface of the cavity to maintain alignment of the gear assembly.

12. The active airflow outlet of claim 9 wherein the plurality of vent blades are maintained at a thirty-five degree angle in the open position.

13. The active airflow outlet of claim 9 wherein the plurality of vent blades are maintained at a seventy degree angle in the open position.

14. The active airflow outlet of claim 9 further comprising a vent housing having a first end, a second end, and a plurality of primary vanes and secondary vanes disposed within the first end, the primary vanes configured to direct airflow through the active airflow outlet vertically and the plurality of secondary vanes configured to direct airflow through the active airflow outlet horizontally, the vent housing second end disposed within the cavity defined by the active outlet housing.

15. The vehicle of claim 7 wherein the plurality of vent blades are maintained at a thirty-five degree angle in the open position.

16. The vehicle of claim 7 wherein the plurality of vent blades are maintained at a seventy degree angle in the open position.

* * * * *